May 5, 1931.  G. W. O'KEEFFE  1,803,766
APPARATUS FOR DRYING
Filed Jan. 8, 1927
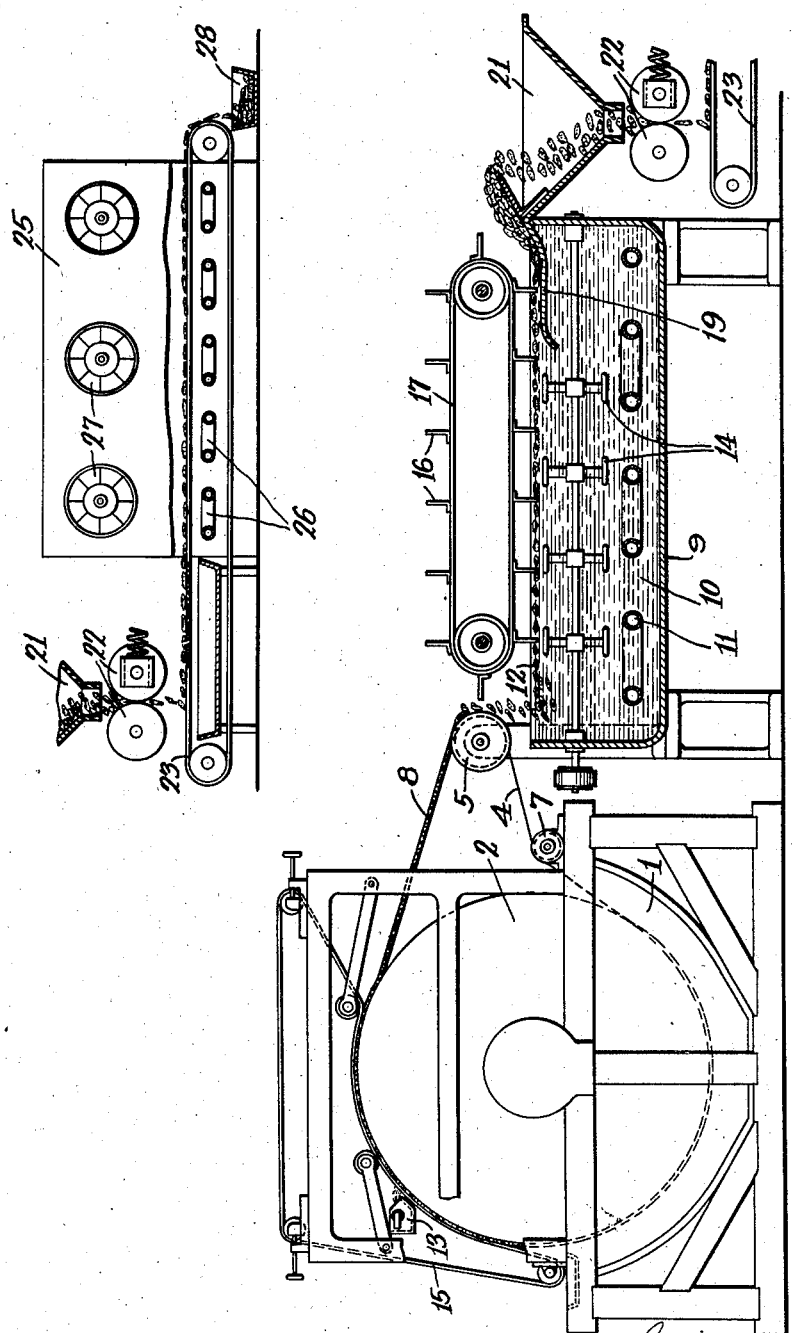
Inventor
George W. O'Keeffe
By his Attorneys
Bohleber + Ledbetter.

Patented May 5, 1931

1,803,766

UNITED STATES PATENT OFFICE

GEORGE W. O'KEEFFE, OF NEW ROCHELLE, NEW YORK

APPARATUS FOR DRYING

Application filed January 8, 1927. Serial No. 159,831.

This invention relates to apparatus for the drying of substances and more particularly to apparatus for drying substances having particular characteristics.

The substances to which the present invention is applicable may be illustrated by that used in the manufacture of phonograph records and the like wherein a gum, like shellac, in flake form is dissolved in an alkali, and the solution resulting therefrom is treated with an acid which precipitates the substance. A recovery is then had of the precipitated substance suspended in the liquid. When recovered, the substance has a granular consistency, very like moist sand, and has entrained therein some of the water and other liquids in which it has been suspended and from which it has precipitated, so that the granular composition has a considerable quantity of fluid entrained therein, say 50%. Ordinary methods of drying this substance in air and by heat require an excessive time, not less than four hours in commercial practice, to accomplish satisfactory drying and the apparatus and drying chambers necessary are relatively expensive and complicated.

The present invention seeks to reduce and simplify the recovery of the precipitate in a convenient and inexpensive manner. To this end the precipitate is recovered by filtration and a slurry, such as the acid treated solution aforementioned, in which the precipitate is suspended is filtered and the filter cake subjected to a washing and dewatering process and then to a liquid removal process.

It has been discovered that such substances as illustrated are repellant to entrained fluids at certain temperatures or within a certain range of temperature. Therefore, according to the present invention, the substance, as recovered by any method but conveniently by filtration, is then subjected to that temperature at which such substance is water repellant. I have found that one substance, such as hereinbefore described, is water repellant when raised to approximately 120° F. Upon raising to this temperature from substantial room temperature the substance acquires a soft and spongy consistency or a plastic amorphous structure and the water is expelled. In carrying out the invention it is preferred to raise the temperature of the substance by immersing it in a fluid which has the desired temperature. The substance floats and has a capacity to agglomerate. It is to be understood that the agglomeration is not incident to or a result of the expulsion of the the fluid content. Agglomeration may be effected by agitation, which I prefer to carry on simultaneously with the fluid expulsion step as a matter of convenience. Upon removing the substance from contact with the hot fluid it is found that the entrained fluid has been practically entirely expelled. The major portion of the fluid entrained in the substance is found to be water and in carrying out my invention I prefer to perform the step of removing the entrained water by immersion in a bath of water raised to that temperature or within that range of temperatures at which the substance expels the entrained fluid.

It is a further object of the invention to provide an apparatus for recovering the practically dry substance from suspension in fluid which includes filtering devices performing the recovery of the substance from the solution from which it has been precipitated.

The substance when recovered in any manner is immersed within a tank of liquid raised to or above that temperature at which the substance is fluid repellant. On removal from the tank the substance is preferably permitted to drain or may, if desired, be thereafter passed through a pair of pressure rolls. From the pressure rolls the substance may fall upon a conveyor which conveys it through a drying chamber within which surface moisture may be "flashed" off.

More particularly, a slurry including the precipitate and the liquids from which it has been precipitated is introduced into the tank of a rotary, continuous, drum-type filter about which a cake reenforcement or conveyor is shown as disposed. This cake reenforcement may take a variety of forms, but is preferably composed of a plurality of endless, substantially parallel strands encircling the filter drum and a roll disposed above the tank of heated fluid. The cake is discharged from the reenforcement into the tank. In the filtering cycle, the precipitate which includes the substance to be dried is disposed upon the surface of the drum and builds up in the form of a cake about the strands of the conveyor. After leaving the zone of filtration, as the filter drum rotates, the filter cake may be subjected to a wash by flowing water over the surface thereof. The wash water is drawn through the cake and through the filter cloth on the peripheral surface of the drum by the suction within the drum. During the washing and subsequent application of suction the cake is overlayed and compacted by a compressor belt which aids the removal of moisture from the voids of the cake while still on the drum. The reenforcement conveys the cake away from the filter drum and the cake is preferably discharged from the reenforcement as the strands thereof pass about a discharge roller and lie within the grooves thereof and the cake falls directly into the tank of liquid heated to that temperature or range of temperatures at which the substance undergoing treatment is fluid repellant. The liquid may be agitated in order to cause the substance to agglomerate for ease and convenience in handling and it may be conveyed along the surface of the liquid by vanes extending therewithin by a continuous belt traveling above the surface of the liquid. These vanes convey the substance up an incline which extends within the liquid onto a draining surface from which the moisture drains back into the liquid and the oncoming substance pushes that which has already been drained over the end of the draining board and into a hopper which discharges it between a pair of pressure rolls. These rolls squeeze surface moisture off the substance. From the rolls the substance falls upon an endless conveyor which permits the liquid squeezed off the substance to fall therethrough while the substance itself is carried by the conveyor through a drying chamber heated in any convenient manner say by recirculated air, to "flash off" the remaining surface moisture.

These and other objects of the invention and the means for their attainment will be apparent from the following detailed description taken in connection with the accompanying drawing illustrating apparatus whereby the drying of substances may be carried out.

It is to be understood that while a compound which is formed by the precipitation of solids from a gum solution is referred to by way of illustration, the invention is not to be deemed limited to that material but is applicable to any substances which may be found repellant to entrained fluid at a predetermined temperature or range of temperature.

The precipitate suspended in the solution may be recovered in various ways, as by means of mechanical separation. It is preferred to recover the precipitate by a filter and particularly a filter of the continuous rotary drum type. Upon recovery the substance may then be washed to free it of chemicals such as free acid and soluble salts. A convenient manner of carrying out the washing is by means of washing devices associated with continuous rotary type filters. Thereafter, a dewatering step may be availed of, which, in connection with filtration, may reside in drawing the water out of the filter cake by the suction of the filter, aided, if desired, by pressure rolls and/or a compressor belt. The precipitate or substance so recovered, which at this stage of operation may be referred to as filter cake, if recovered by filtration, now has a granular moist structure having entrained within it, in some instances, approximately 50% of moisture. Advantage is taken of the characteristics of the material, which I have discovered, wherein the fluid entrained therein is repelled or expelled upon causing the substance to react in a peculiar manner. I have discovered that these substances may be caused to be water repellant by raising them to a certain temperature or to within a certain range of temperatures, that is, between a minimum and a maximum temperature. This may be conveniently accomplished by bringing a fluid raised to the desired temperature in intimate contact with the substance. For instance the intimate contact of heated water has been found to give excellent results and I prefer therefore to cause the substance to become fluid repellant by immersing the same in water raised to a predetermined temperature. The subjection of the substance to a hot fluid may require no more than two or three minutes to cause an expulsion of the entrained fluid. At this critical or minimum predetermined tempeature the substance also begins to soften.

For convenience in handling it is desirable to agglomerate the substance and I have found that agitation carried on subsequently to the water repelling step or simultaneously therewith will cause the substance to agglomerate.

The substance may then be removed from contact with the heated fluid and its fluid content which is practically all surface moisture will be found to be approximately 10%. Drainage permits the reduction of surface moisture to approximately 4%.

In situations where the permissible moisture content is, say 1%, the substance may be passed through pressure rolls which squeeze the small quantity of fluid in the agglomerate to the surface thereof, some of which falls immediately therefrom and thereafter the surface fluid may be caused to "flash-off"

by a subsequent drying step. For instance the substance may be caught, after it passes from between the pressure rolls, upon a screen conveyor which will pass fluid squeezed therefrom and which will carry the substance through recirculated air for a period sufficient to permit the surface moisture to evaporate. This has been found in some situations to be not longer than three minutes.

Referring now to the drawings, a slurry comprising a liquid in which a precipitate is suspended is contained within the tank 1. Upon this tank is rotatably mounted a filter drum 2 of the continuous filter type. About the drum is disposed a conveying reenforcement 4 which may take the form of an endless mesh belt or a pluarlity of spaced, preferably parallel, separate strands encircling the drum and a terminal roll 5. Another roll, such as the roll 7, which, if spaced strands are used, may be peripherally grooved is availed of to guide and direct the reenforcement back on the drum. The filter cake formed on the periphery of the drum in the cake forming zone is deposited in the interstices of the reenforcement and builds up about the same in the form of a cake. The manner in which the cake reenforcement operates will not be described in detail since it forms the subject matter of copending applications and issued patents, reference being had to Patent No. 1,472,574, dated October 30, 1923, and issued to Arthur Wright and F. W. Young as illustrating one type of reenforcement applicable in this situation. The cake 8 may be conveyed away from the filter drum by the reenforcement to the roll 5 which may be an idle roll or may be caused to rotate in synchronism with the filter drum. Obviously, the use of other means to discharge the filter cake from the filter is within the purview of the invention.

To remove free acid and soluble salts the filter cake 8 is washed, that is, water from a tank 13, may be permitted to freely flow over the surface of the cake and be drawn therethrough by the action of the suction within the drum 2. This water or any such remaining in the cake may then be withdrawn by subsequent suction while overlayed by a compressor belt 15, which is made porous enough to permit the free flow of water therethrough in the cake washing zone, the compressor belt serving to compact the cake to facilitate its dewatering and subsequent removal with the reenforcement. When the reenforcement takes the form of independent strands, the roll 5 may be grooved peripherally to receive those strands and shear off the filter cake therefrom by the peripheral portion of the roll between the grooves, and permit it to fall into a tank 9. If other types of reenforcement are used, other discharge means such as vibrators may be used. The granular consistency of the material may, with some substances, be such that the cake will break up and fragments thereof fall into the tank 9 without recourse to cake discharge devices with the conveyor 4.

At this stage the substance is in the form of coarse grains with a spongy structure.

The water repelling step is carried on in the tank 9 and to this end I prefer to immerse the substance in fluid 10 in the tank 9, maintained at the so-called fluid repelling temperature of the substance, that is, at that temperature or between such temperatures at which, it is found, the substance is fluid repellant. In the example used by way of illustration that temperature is approximately 120° F. The temperature of the fluid may be maintained at the desired temperature by means of steam coils 11 or the equivalent. The fluid 10 may be, conveniently a liquid, such as water. In the interest of accuracy, it will, of course, be realized that the substance, as introduced into the fluid, will be at a temperature below that at which it is fluid repellant and that there will be a heat interchange between the fluid and the substance until the substance is raised to that temperature at which it is fluid repellant. When, therefore, we use the expression fluid (or liquid) raised to that temperature at which the substance is fluid repellant, we realize that additional heat units must be supplied to the fluid (or liquid) which are taken up by the substance so that the resulting temperature of the substance and fluid (or liquid) is that at which the substance is fluid repellant. The additional heat units supplied to the fluid (or liquid) may be readily determined and will depend in large measure upon the quantity of substance delivered to the fluid (or liquid) as well as the volume of the fluid (or liquid). So soon as the substance is raised to that temperature at which it is fluid repellant, of course, the temperature of both fluid (or liquid) and substance remains or is maintained at that temperature. Therefore by the expression "fluid (or liquid) raised to that temperature at which the substance is fluid repellant" is intended that temperature of the fluid (or liquid) which, after the aforesaid heat interchange has taken place, will maintain the substance at the required temperature to cause it to expel the entrained fluid.

So soon as the substance is immersed in the heated fluid 10 it is raised to that temperature and the entrained fluid expelled. The substance floats on or near the surface, as indicated at 12, and becomes soft and spongy. To permit the mass to be conveniently handled it is caused to agglomerate, that is, collect in lumps, which are found to float upon or close to the surface of the liquid 10. I have discovered that agitation will cause this agglomeration and to this end the tank 9 is provided with agitators, in the form of rotating paddles 14 driven from any convenient source of power, so as to agitate the liquid at its surface.

The substance is next removed from the liquid 10 and the means, which are illustrated as having been adopted, comprise rakes or vanes 16 mounted upon the endless belt 17 travelling above the surface of the liquid and projecting downwardly within the liquid 10 a sufficient distance to collect and sweep along the substance before them through the tank and up onto the receiving and draining platform 19 from which the material is pushed by oncoming substance and falls into a hopper 21, liquid, i. e., liquid 10 and surface moisture, draining off back into the tank 9. Practically all entrained fluid is now expelled and surface moisture on the substance amounts to about 10%. About 6% of this moisture drains back while the material is on the draining platform so that as the material falls into the hopper it carries only about 4% of moisture on its surface. From the hopper it is permitted to fall between the pair of adjustable pressure rolls 22 from which the material falls in the form of somewhat spongy waxlike lumps onto a conveyor 23. The conveyor 23 is also preferably an endless belt of screen formation so that the moisture squeezed out by the pressure rolls 22 will fall through the screen and be conveyed away.

The small amount of remaining surface moisture may then be removed by introducing the substance into a drying chamber. The belt 23 is shown passing through a drying chamber 25 in which air warmed by steam pipes 26 is circulated through the screen conveyor by the fans 27, the belt 23 extending through the opposite side of the drying chamber 25 so that the substance as it arrives at the end of the reach may fall off into a container 28.

The time consumed in transit of the substance from the moment of its recovery from the slurry in the tank 1 to the container 28 may only be a matter of a few minutes as compared with several hours under the usual drying methods. For instance, the step of filtration may take about three minutes. Not more than one minute is required for the conveyance of the substance through the tank 9 and not more than three minutes is required for the substance to travel through the drying chamber 25. The speed of the conveyors 17 and 23 are regulated according to the substance to be treated, as will be obvious to one skilled in the art, and the speed of the filter drum 12 is so controlled as to permit the formation of adequate cake capable of satisfactory conveyance by the reenforcement 4.

Various modifications will occur to those skilled in the art in the manner in which the precipitate is recovered as well as in the form taken by the conveying devices and temperature raising devices and it is also to be understood that certain of the steps hereinbefore described may be eliminated with the consequent elimination of the apparatus used in the step without departing from the scope of the invention as delineated in the attached claims.

I claim:

1. Apparatus for drying substances repellant to entrained fluid comprising a tank of liquid, means to raise the liquid to that temperature at which the substance is fluid repellant, means to immerse the substance in the liquid, means to agglomerate the substance while immersed and means to remove the substance from the liquid.

2. Apparatus for drying substances repellant to entrained fluid comprising a tank of liquid, means to raise the liquid to that temperature at which the substance is fluid repellant, means to immerse the substance in the liquid, means to agitate the liquid at its surface and means to remove the substance from the liquid.

3. Apparatus for drying substances repellant to entrained fluid comprising a tank of liquid, means to raise the liquid to that temperature at which the substance is fluid repellant, means to immerse the substance in the liquid, means to agitate the liquid at its surface, means to convey the substance through the liquid and means to remove the substance from the liquid.

4. Apparatus for drying substances repellant to entrained fluid comprising a tank of liquid, means to raise the liquid to that temperature at which the substance is fluid repellant, means to immerse the substance in the liquid, means to agitate the liquid at its surface, means to convey the substance through the liquid, means to remove the substance from the liquid and means to drain the substance.

5. Apparatus for drying substances repellant to entrained fluid comprising a tank of liquid, means to raise the liquid to that temperature at which the substance is fluid repellant, means to immerse the substance in the liquid, means to agitate the liquid at its surface, means to remove the substance from the liquid and means to drain the substance.

6. Apparatus for drying substances repellant to entrained fluid comprising a tank of liquid, means to raise the liquid to that temperature at which the substance is fluid repellant, means to immerse the substance in the liquid, means to remove the substance and means to compress the substance.

7. Apparatus for drying substances repellant to entrained fluid comprising a tank of liquid, means to raise the liquid to that temperature at which the substance is fluid repellant, means to immerse the substance in the liquid, means to agitate the substance, means to convey the substance through the liquid, means to drain the substance and means to compress the substance.

8. Apparatus for drying substances repellant to entrained fluid comprising a tank of liquid, means to raise the liquid to that temperature at which the substance is fluid repellant, means to immerse the substance in the fluid, means to remove the substance therefrom and a drying chamber for the substance.

9. Apparatus for drying substances repellant to entrained fluid comprising a tank of liquid, means to raise the liquid to that temperature at which the substance is fluid repellant, means to immerse the substance in the liquid, means to agitate the liquid, means to remove the substance from the liquid, means to drain the substance, means to compress the substance, a drying chamber and means to convey the substance through the chamber.

10. An apparatus for drying substances repellant to entrained fluid, means to recover a precipitate, a tank of liquid, means to raise the temperature of the liquid to that temperature at which the precipitate is fluid repellant, means to immerse the precipitate in the liquid and means to remove the precipitate therefrom.

11. Apparatus for drying substances repellant to entrained fluid comprising means to recover the substance as a precipitate, a tank of liquid, means to raise the liquid to that temperature at which the substance is fluid repellant, means to immerse the substance in the liquid, means to agglomerate the substance, means to drain the substance and means to remove surface moisture therefrom.

12. Apparatus for drying substances repellant to entrained fluid comprising a filter, a tank of liquid, means to deliver substance from the filter to the tank and means to raise the liquid in the tank to that temperature at which the substance is fluid repellant.

13. Apparatus for drying substances repellant to entrained fluid comprising a rotary filter, a continuous reenforcement for filter cake, a tank of liquid to receive filter cake from the reenforcement, means to raise the liquid to that temperature at which the cake is fluid repellant and a drain for the cake.

14. Apparatus for drying substances repellant to entrained fluid comprising a rotary filter, a continuous reenforcement for filter cake, a tank of liquid to receive cake from the reenforcement, means to raise the temperature of the liquid to that at which the substance is fluid repellant, a draining surface extending into a liquid, a traveling belt above the liquid having vanes extending therewithin to convey the substance through the liquid and on to the drain.

15. Apparatus for drying substances repellant to entrained fluid comprising a rotary filter, a continuous reenforcement for filter cake, a tank of liquid to receive cake from the reenforcement, means to raise the temperature of the liquid to that at which the substance is fluid repellant, a draining surface extending into a liquid, a traveling belt above the liquid having vanes extending therewithin to convey the substance through the liquid and on to the drain and squeeze rolls to receive the substance from the drain.

16. Apparatus for drying substances repellant to entrained fluid comprising a rotary filter, a continuous reenforcement for filter cake, a tank of liquid to receive cake from the reenforcement, means to raise the temperature of the liquid to that at which the substance is fluid repellant, a draining surface extending into the liquid, a traveling belt above the liquid having vanes extending therewithin to convey the substance through the liquid and on to the drain and agitators in the liquid.

17. Apparatus for drying substances repellant to entrained fluid comprising a filter, a continuous reenforcement for filter cake, a tank of liquid, to receive cake from the reenforcment, means to raise the liquid to that temperature at which the substance is fluid repellant, means to remove the substance from the liquid, a drying chamber and a conveyor for the substance through the chamber.

18. Apparatus for drying substances repellant to entrained fluid comprising a rotary filter, a continuous reenforcement for filter cake, a tank of liquid to receive cake from the reenforcement, means to raise the temperature of the liquid to that at which the substance is fluid repellant, a draining surface extending into the liquid, a traveling belt above the liquid having vanes extending therewithin to convey the substance through the liquid and on to the drain, pressure rolls to receive the substance from the drain, a conveyor to receive the substance from the rolls, and a drying chamber through which the conveyor passes.

19. Apparatus for drying substances repellant to entrained fluid comprising a tank of fluid means to raise the temperature of the fluid to that predetermined value at which the substance is fluid repellant and means at the surface of the fluid in the tank to agglomerate said substance simultaneously with the heating of the substance.

20. Apparatus for drying substances repellant to entrained fluid comprising a tank of fluid means to raise the temperature of the fluid to that predetermined value at which the substance is fluid repellant, means at the surface of the fluid in the tank to agglomerate the substance simultaneously with the heating of the substance and means to remove surface moisture.

21. Apparatus for drying substances repellant to entrained fluid comprising in combination, a filter, means to remove substance from the filter, a tank of liquid to receive the substance, means to raise the liquid in the tank to that temperature at which the substance is fluid repellant, means to remove the substance from the liquid and a drying chamber for the substance.

22. Apparatus for drying substances repellant to entrained fluid comprising a filter to recover the substance as filter cake, means to wash the filter cake, means to remove the filter cake from the filter, a tank of liquid to receive the substance so removed, means to raise the liquid in the tank to that temperature at which the substance is fluid repellant, means to remove the substance from the liquid and means to remove the surface moisture from the substance.

23. Apparatus for drying substances repellant to entrained fluid comprising a filter to recover the substance as filter cake, means to wash the filter cake, means to remove the filter cake from the filter, a tank of liquid to receive the substance so removed, means to raise the liquid in the tank to that temperature at which the substance is fluid repellant, means to remove the substance from the liquid, means to drain the substance and means to dry the substance.

24. Apparatus for drying substances repellant to entrained fluid comprising a filter to recover the substance as filter cake, means to wash the filter cake, means to remove the filter cake from the filter, a tank of liquid to receive the substance so removed, means to raise the liquid in the tank to that temperature at which the substance is fluid repellant, means to remove the substance from the liquid, means to drain the substance, squeeze rolls through which the substance passes and means to dry the substance.

25. Apparatus for drying substances repellant to entrained fluid comprising, in combination, a rotary filter, a continuous reenforcement for filter cake, means to discharge the cake from the reenforcement, a tank of liquid to receive filter cake from the reenforcement, means to raise the liquid to that temperature at which the cake is fluid repellant and a drain for the cake.

In testimony whereof I affix my signature.
GEORGE W. O'KEEFFE.